(12) United States Patent
Gau et al.

(10) Patent No.: US 7,796,955 B2
(45) Date of Patent: Sep. 14, 2010

(54) EXPANDABLE WIRELESS TRANSCEIVER

(75) Inventors: Jiahn-Rong Gau, Hsinchu (TW);
Ching-Cheng Huang, Hsinchu (TW);
Cheng-Hsiung Hsu, Hsinchu (TW);
Tzu-Ping Lin, Hsinchu (TW);
Chen-Chia Huang, Hsinchu (TW)

(73) Assignee: Wistron Neweb Corp., Hsinchu (TW)

( * ) Notice: Subject to any disclaimer, the term of this patent is extended or adjusted under 35 U.S.C. 154(b) by 633 days.

(21) Appl. No.: 11/778,853

(22) Filed: Jul. 17, 2007

(65) Prior Publication Data

US 2008/0287071 A1     Nov. 20, 2008

(30) Foreign Application Priority Data

May 16, 2007    (TW) .............................. 96117442 A

(51) Int. Cl.
*H04B 1/38*     (2006.01)
(52) U.S. Cl. .............................. 455/73; 455/78; 455/83; 455/82; 455/562.1; 455/575.7; 455/552.1; 343/702; 343/718
(58) Field of Classification Search .................... 455/73, 455/78, 83, 82, 562.1, 575.7, 552.1; 343/702, 343/718
See application file for complete search history.

(56) References Cited

U.S. PATENT DOCUMENTS

| | | | | |
|---|---|---|---|---|
| 5,838,720 | A * | 11/1998 | Morelli ........................ 375/219 |
| 5,854,986 | A * | 12/1998 | Dorren et al. ............ 455/562.1 |
| 6,032,054 | A * | 2/2000 | Schwinke .................... 455/557 |
| 6,075,497 | A * | 6/2000 | Chen et al. ................... 343/840 |
| 6,560,443 | B1 * | 5/2003 | Vaisanen et al. .............. 455/73 |
| 6,967,619 | B2 * | 11/2005 | Khoo et al. ........... 343/700 MS |
| 7,260,424 | B2 * | 8/2007 | Schmidt ................... 455/575.7 |
| 7,262,737 | B2 * | 8/2007 | Zarnowitz et al. ........... 343/702 |
| 7,526,267 | B2 * | 4/2009 | Schmidt ..................... 455/403 |
| 7,647,035 | B2 * | 1/2010 | Rofougaran ................ 455/313 |
| 7,647,053 | B2 * | 1/2010 | Pitchers ...................... 455/450 |
| 2005/0107043 | A1 * | 5/2005 | Avasarala et al. ............. 455/78 |
| 2006/0121937 | A1 * | 6/2006 | Son ......................... 455/553.1 |
| 2006/0178111 | A1 * | 8/2006 | Choi et al. .................. 455/63.1 |
| 2006/0270427 | A1 * | 11/2006 | Shida et al. ................. 455/512 |
| 2006/0286941 | A1 * | 12/2006 | Behroozi ..................... 455/78 |

* cited by examiner

*Primary Examiner*—Marceau Milord
(74) *Attorney, Agent, or Firm*—J.C. Patents

(57) ABSTRACT

An expandable wireless transceiver is provided. The expandable wireless transceiver includes an antenna, a receiver, a transmitter and a switch connector. The antenna detects an electromagnetic signal in surrounding space and receives a signal with a first central frequency according to the detection result. The receiver receives the signal based on the detection result of the antenna. The transmitter outputs a radio-frequency signal. A third connection terminal of the switch connector provides a connective path to an expansion antenna. According to the coupling condition of the third connection terminal, the switch connector delivers the radio-frequency signal to its second connection terminal or third connection terminal. Thus, the radio-frequency signal with a second central frequency is transmitted to surrounding space through the antenna or the expansion antenna, wherein the second central frequency and the first central frequency are both in a specific band.

13 Claims, 4 Drawing Sheets

EXPANDABLE WIRELESS TRANSCEIVER

CROSS-REFERENCE TO RELATED APPLICATION

This application claims the priority benefit of Taiwan application serial no. 96117442, filed on May 16, 2007. All disclosure of the Taiwan application is incorporated herein by reference.

BACKGROUND OF THE INVENTION

1. Field of the Invention

The present invention generally relates to a wireless transceiver, more particularly, to a wireless transceiver with an expandable antenna.

2. Description of Related Art

A series of technological breakthroughs in recent years have lead to the rapid development of wireless communication techniques. The appearance of wireless wide-band network, wireless voice communication and wireless broadcast points to the significant advancement and variety of wireless communication techniques now available. In everyday life, people buy products, for example, cellular phones, portable televisions, radios and walkie-talkies, with wireless transceiver function so as to access the electromagnetic signal in surrounding space. All these products have one common feature, they must have an antenna for receiving and transmitting electromagnetic signal.

FIG. 1 is a block diagram of a conventional wireless transceiver with a single antenna. As shown in FIG. 1, the wireless transceiver 100 with a single antenna includes an antenna 110, a receiver 120, a transmitter 130 and a coupler 140. A first signal terminal 141 of the coupler 140 is coupled to the receiver 120, a second signal terminal 142 of the coupler 140 is coupled to the transmitter 130, and a third signal terminal 143 of the coupler 140 is coupled to the antenna 110. As a whole, the wireless transceiver 100 receives and transmits an electromagnetic signal through the antenna 110, and the coupler 140 is used to redirect the signal. In other words, when the antenna 110 receives an electromagnetic signal from surrounding space, the electromagnetic signal is delivered to the third signal terminal 143 of the coupler 140. At this time, the coupler 140 couples the electromagnetic signal received by the third signal terminal 143 to the first signal terminal 141 so that the receiver 120 can receive the electromagnetic signal. Similarly, after the transmitter 130 outputs a radio-frequency signal, the radio-frequency signal is delivered to the second signal terminal 142 of the coupler 140. Therefore, the coupler 140 couples the radio-frequency signal received by the second signal terminal 142 to the third signal terminal 143, and the radio-frequency signal is transmitted to surrounding space through the antenna 110.

It should be noted that the circuit for operating the wireless transceiver 100 with a single antenna is more complicated. Because the device needs to use the only antenna for transmitting and receiving signals, a complicated circuit design is required to boost the selectivity of the wireless transceiver 100 so as to prevent intermediation distortion on the sensitivity of the received signal due to inter-mediation distortion.

FIG. 2 is a block diagram of a conventional wireless transceiver with two antennas. As shown in FIG. 2, the wireless transceiver 200 with two antennas includes an antenna 210, an antenna 220, a receiver 230 and a transmitter 240. The antenna 210 is coupled to the receiver 230 and the antenna 220 is coupled to the transmitter 240. As a whole, the wireless transceiver 200 with two antennas uses the antenna 210 to receive the electromagnetic signal and uses the antenna 220 to transmit the radio-frequency signal. Therefore, the wireless transceiver 200 with two antennas can lower the effect of intermediation distortion on sensitivity, and circuit design can be simplified. However, the transceiver 200 must install both antennas 210 and 220 simultaneously and there are no other options in its operation.

Accordingly, each of the wireless transceivers 100 and 200 has its merits and demerits. Therefore, when a transceiver can have single-antenna and two-antenna characteristics simultaneously so that a user can choose the mode to operate, the transceiver is more useful and has more market worth.

SUMMARY OF THE INVENTION

Accordingly, the present invention provides an expandable wireless transceiver that allows a user to choose between a single-antenna operating mode and a two-antenna operating mode without increasing the hardware space of the expandable wireless transceiver. Therefore, the user can determine whether to use a single antenna or two antennas according to the characteristic of signal reception and the convenience of installation so that the expandable wireless transceiver can have greater operating flexibility.

According to an embodiment of the present invention, an expandable wireless transceiver is provided. The expandable wireless transceiver includes an antenna, a receiver, a transmitter and a switch connector. The antenna detects an electromagnetic signal in surrounding space and receives a signal with a first central frequency according to the detection result. The receiver is coupled to the antenna for receiving the signal based on the detection result of the antenna. The transmitter outputs a radio-frequency signal. The switch connector has a first connection terminal, a second connection terminal and a third connection terminal. The first connection terminal is coupled to the transmitter, the second connection terminal is coupled to the antenna, and the third connection terminal provides a connective path to an expansion antenna. According to the coupling condition of the third connection terminal, the switch connector delivers the radio-frequency signal received by the first connection terminal to the second connection terminal or the third connection terminal.

As a consequence of the above, a radio-frequency signal with a second central frequency can be transmitted to surrounding space through the antenna or the expansion antenna, wherein the second frequency and the first frequency are both in a specific band.

According to an embodiment of the present invention, the expandable wireless transceiver further includes a coupler. The coupler has a first signal terminal, a second signal terminal and a third signal terminal. The first signal terminal is coupled to the receiver, the second signal terminal is coupled to the second connection terminal of the switch connector, and the third signal terminal is coupled to the antenna. Here, the signal with the first central frequency received by the third signal terminal of the coupler is coupled to its first signal terminal, and the radio-frequency signal received by the second signal terminal of the coupler is coupled to its third signal terminal.

In an embodiment of the present invention, the expandable wireless transceiver further includes an blocking component. The blocking component has a first terminal and a second terminal. The first terminal is coupled to the second signal terminal of the coupler and the second terminal is coupled to the second connection terminal of the switch connector. The blocking component is used for attenuating the radio-frequency signal.

In an embodiment of the present invention, the expandable wireless transceiver further includes a bandpass filter. The bandpass filter is coupled between the coupler and the receiver and is used for filtering the radio-frequency signal with the second central frequency.

In another embodiment of the present invention, the expandable wireless transceiver further includes an blocking component. The blocking component has a first terminal and a second terminal. The first terminal is coupled to the antenna and the second terminal is coupled to the second connection terminal of the switch connector. The blocking component is used for attenuating the radio-frequency signal.

In yet another embodiment of the present invention, the expandable wireless transceiver further includes a bandpass filter. The bandpass filter is coupled between the antenna and the receiver and is used for filtering the radio-frequency signal with the second central frequency.

The present invention uses a switch connector to provide a connective path to an expansion antenna so that the expandable wireless transceiver can have a single-antenna operation mode and a two-antenna operating mode and retain the characteristic of using a single antenna or two antennas. Therefore, a user can determine whether to use a single antenna or two antennas according to the characteristic of the signal reception and the convenience of the installation. As a result, usefulness of the expandable wireless transceiver is substantially increased so that user can use the transceiver with great convenience.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
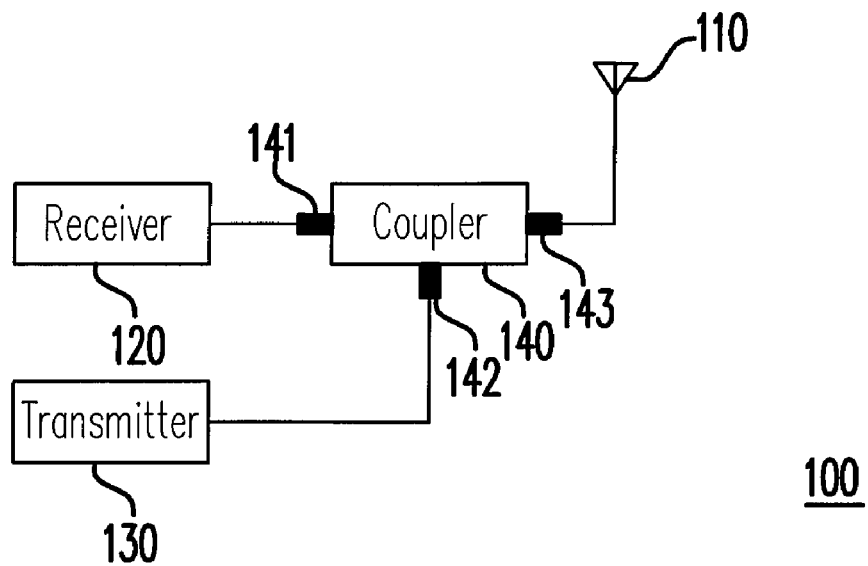
FIG. 1 is a structural diagram of a conventional wireless transceiver with a single antenna.
Figure 2:
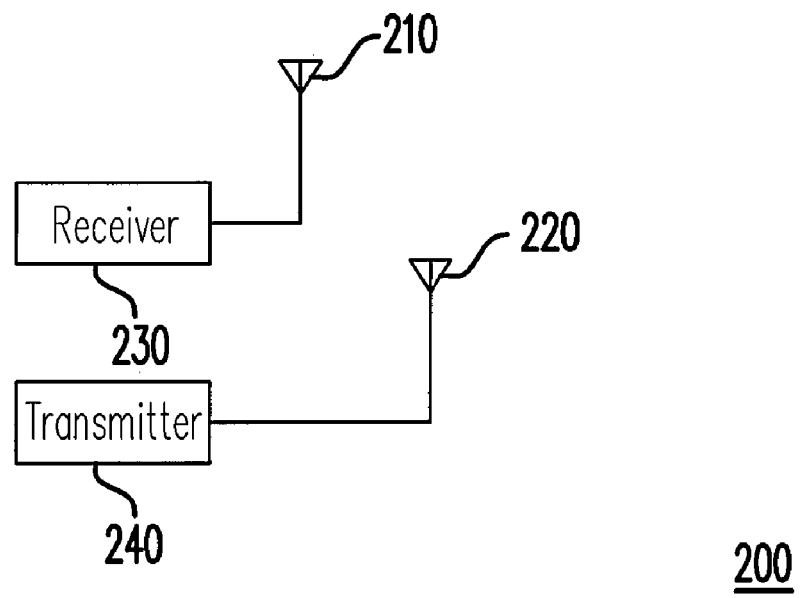
FIG. 2 is a structural diagram of a conventional wireless transceiver with two antennas.

Reference will now be made in detail to the present preferred embodiments of the invention, examples of which are illustrated in the accompanying drawings. Wherever possible, the same reference numbers are used in the drawings and the description to refer to the same or like parts.

Before using a few embodiments in the following to describe the spirit of the present invention, it must be said that the specific band used by the expandable wireless transceivers listed in the following embodiments includes a plurality of frequencies. Therefore, the first central frequency and the second central frequency used by the expandable wireless transceiver are only two of the frequencies among the plurality of frequencies. Furthermore, the selection of the first central frequency and the second central frequency is based on the design and hence is not limited here. In other words, the expandable wireless transceiver is used for transmitting and receiving signals belonging to the same frequency band but different central frequencies.

In addition, the specific band used by the expandable wireless transceiver includes one of the communication bands specified for frequency modulation (FM) wireless broadcast, Bluetooth system and global mobile communication system. For example, when the specific band used by the expandable wireless transceiver is the one specified for FM wireless broadcast, the frequency range of the specific band is between 87 MHz~108 MHz.

Figure 3A:
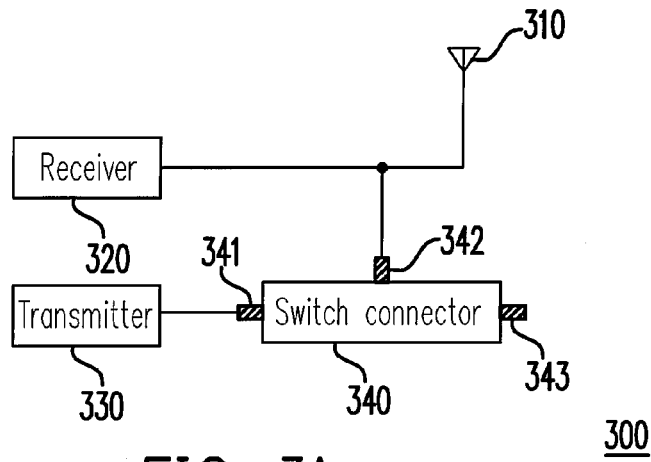
FIG. 3A is a structural diagram of an expandable wireless transceiver according to an embodiment of the present invention.

FIG. 3A is a structural diagram of an expandable wireless transceiver according to an embodiment of the present invention. As shown in FIG. 3A, the expandable wireless transceiver 300 includes an antenna 310, a receiver 320, a transmitter 330 and a switch connector 340. The switch connector 340 has a first connection terminal 341, a second connection terminal 342 and a third connection terminal 343. Furthermore, the first connection terminal 341 is coupled to the transmitter 330, the second connection terminal 342 is coupled to the antenna 310, and the third connection terminal 343 is used for providing a connective path to an expansion antenna (not shown). In addition, the receiver 320 is coupled to the antenna 310.

As a whole, the antenna 310 detects the electromagnetic signal in surrounding space. Therefore, the antenna 310 receives a signal with a first central frequency according to the detection result. Next, the receiver 230 receives the signal with the first central frequency based on the detection result of the antenna 310.

On the other hand, the transmitter 330 outputs a radio-frequency signal to the first connection terminal 341 of the switch connector 340. According to the coupling condition of the third connection terminal 343, the switch connector 340 delivers the radio-frequency signal to the second connection terminal 342 or the third connection terminal 343. At this time, when the third connection terminal 343 is not coupled to an external object (for example, an expansion antenna), the first connection terminal 341 of the switch connector 340 is coupled to the second connection terminal 342. Hence, the radio-frequency signal is delivered to the second connection terminal 342. Finally, the antenna 310, which is coupled to the second connection terminal 342, transmits a signal with a second central frequency to surrounding space, thereby completing the process of transmitting and receiving signal through the expandable wireless transceiver.

Figure 3B:
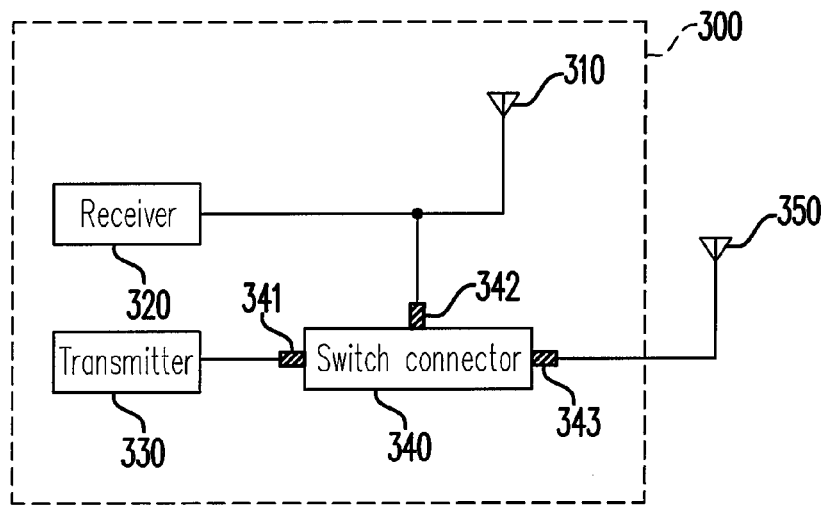
FIG. 3B is a structural diagram of an expandable wireless transceiver connected to an external expansion antenna according to an embodiment of the present invention.

In addition, when the third connection terminal 343 of the switch connector 340 is coupled to an expansion antenna 350 as shown in FIG. 3B, the switch connector 340 couples the first connection terminal 341 to the third connection terminal 343 according to this coupling condition. Therefore, the switch connector 340 delivers the radio-frequency signal received by the first connection terminal 341 to the third connection terminal 343. As a result, the expandable wireless transceiver 300 can transmit the radio-frequency signal with the second central frequency to surrounding space through the externally connected expansion antenna 350.

Figure 3C:
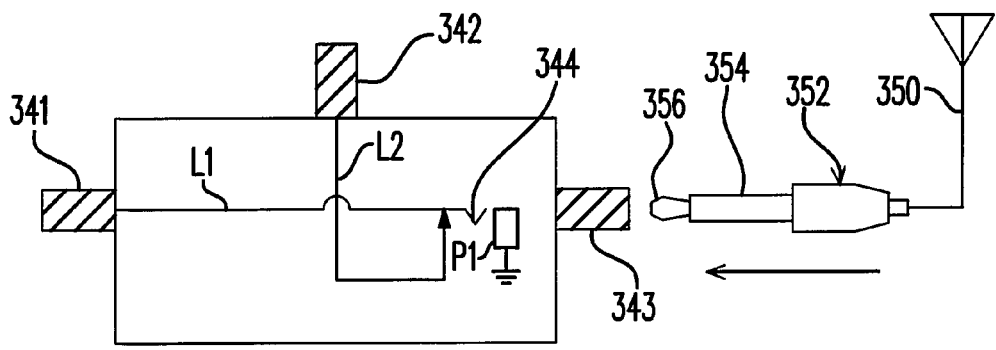
FIG. 3C is a transparent diagram of the expandable wireless transceiver in FIG. 3A before having an external expansion antenna connected thereto.

More specifically, FIG. 3C is a transparent diagram of the expandable wireless transceiver in FIG. 3A before having an external expansion antenna connected thereto. As shown in FIG. 3C, the switch connector 340 includes a metal conductive line L1, a metal conductive line L2 and a metal conductive plate P1. Furthermore, the front end of the metal conductive line L1 has a metal spring 344 and a first end of the metal conductive line L1 is coupled to the first connection terminal 341. A first end of the metal conductive line L2 is coupled to the second connection terminal 342 and a second end of the metal conductive line L2 is coupled to the second end of the metal conductive line L1. The metal conductive plate P1 is connected to a ground. In addition, the front portion of the expansion antenna 350 has a plug connector 352. The front portion of the conductive terminal of the plug connector 352 is a signal conductive part 356 and the rear portion of the conductive terminal of the plug connector 352 is a ground connecting part 354.

As shown in FIGS. 3A, 3B and 3C, the metal conductive line L1 and the metal conductive line L2 are electrically connected before the plug connector 352 is plugged into the switch connector 340. Therefore, the radio-frequency signal received by the first connection terminal 341 is delivered to the second connection terminal 342. Consequently, the radio-frequency signal with the second central frequency can be transmitted into surrounding space through the antenna 310, which is connected to the second connection terminal 342. Furthermore, when the plug connector 352 is plugged into the third connection terminal 343 of the switch connector 340 for connecting with the expansion antenna 350, the signal conductive part 356 of the plug connector 352 pushes up the metal spring 344. Therefore, the signal conductive part 356 of the plug connector 352 is electrically connected to the metal spring 344, and the electrical connection between the metal conductive line L1 and the metal conductive line L2 is broken. In the meantime, the ground connection part 354 of the plug connector 352 is coupled to the metal conductive plate P1, and the metal conductive line L1 is coupled to the expansion antenna 350. Thus, the first connection terminal 341 can deliver the radio-frequency signal to the expansion antenna 350, and the expandable wireless transceiver 300 transmit the radio-frequency signal with the second central frequency to surrounding space through the expansion antenna 350.

Because the expandable wireless transceiver 300 is connected to an external expansion antenna 350, the expandable wireless transceiver 300 can use the antenna 310 to receive the signal with the first central frequency from surrounding space and can use the expansion antenna 350 to transmit the radio-frequency signal with the second central frequency to surrounding space. Compared with the condition of the expandable wireless transceiver 300 not connected to the external expansion antenna 350, the expandable wireless transceiver 300 can only use the antenna 310 to receive and transmit signal. Hence, the expandable wireless transceiver 300 is able to provide a user with the option of operating with a single antenna or two antennas characteristic so that the user can have one more selection.

The expandable wireless transceiver 300 of the present invention has a number of different embodiments. In the following, other embodiments are used to describe the expandable wireless transceiver of the present invention.

Figure 4:
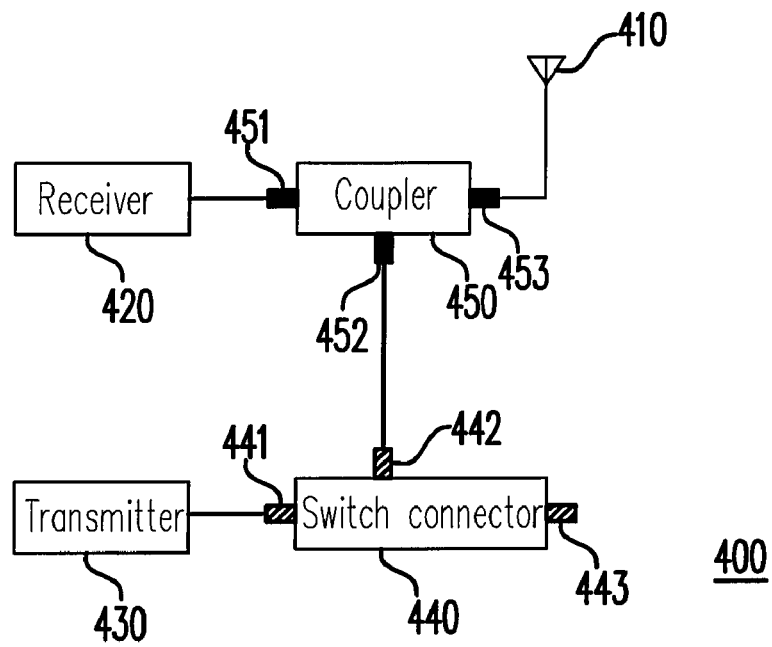
FIG. 4 is a structural diagram of an expandable wireless transceiver according to another embodiment of the present invention.

FIG. 4 is a structural diagram of an expandable wireless transceiver according to another embodiment of the present invention. As shown in FIG. 4, the expandable wireless transceiver 400 includes an antenna 410, a receiver 420, a transmitter 430, a switch connector 440 and a coupler 450. The coupler 450 has a first signal terminal 451, a second signal terminal 452 and a third signal terminal 453. The first signal terminal 451 is coupled to the receiver 420, the second signal terminal 452 is coupled to the switch connector 440, and the third signal terminal 453 is coupled to the antenna 410. The switch connector 440 has a first connection terminal 441, a second connection terminal 442 and a third connection terminal 443. The first connection terminal 441 is coupled to the transmitter 430, the second connection terminal 442 is coupled to the second signal terminal 452, and the third connection terminal 443 is used for providing a connective path to an expansion antenna.

In the present embodiment, the transmission and reception of signal by the expandable wireless transceiver 400 are similar to the foregoing embodiment. In other words, the antenna 410 of the expandable wireless transceiver 300 is used to transmit and receive signal when an external expansion antenna is not connected to the third connection terminal 443. In contrast, when the third connection terminal 443 is coupled to the expansion antenna, the expansion wireless transceiver 300 uses the antenna 410 to receive signal while the expansion antenna is used to transmit radio-frequency signal. However, the main difference is that the coupler 450 in the present embodiment is used for redirecting the signal with first central frequency received by the expandable wireless transceiver 400 and the radio-frequency signal transmitted by the expandable wireless transceiver 400. In other words, the third signal terminal 453 couples the received signal with first central frequency to the first signal terminal 451, and the second signal terminal 452 couples the received radio-frequency signal to the third signal terminal 453. Therefore, through the foregoing operation, interference between the transmitting and receiving signals is minimized so as to prevent its effect on the sensitivity of the expandable wireless transceiver 400. In the present embodiment, the coupler 450 can be a directional coupler, a wave separator or coherent phase combiner, and any one of the above devices can be used to achieve the foregoing effects.

Figure 5:
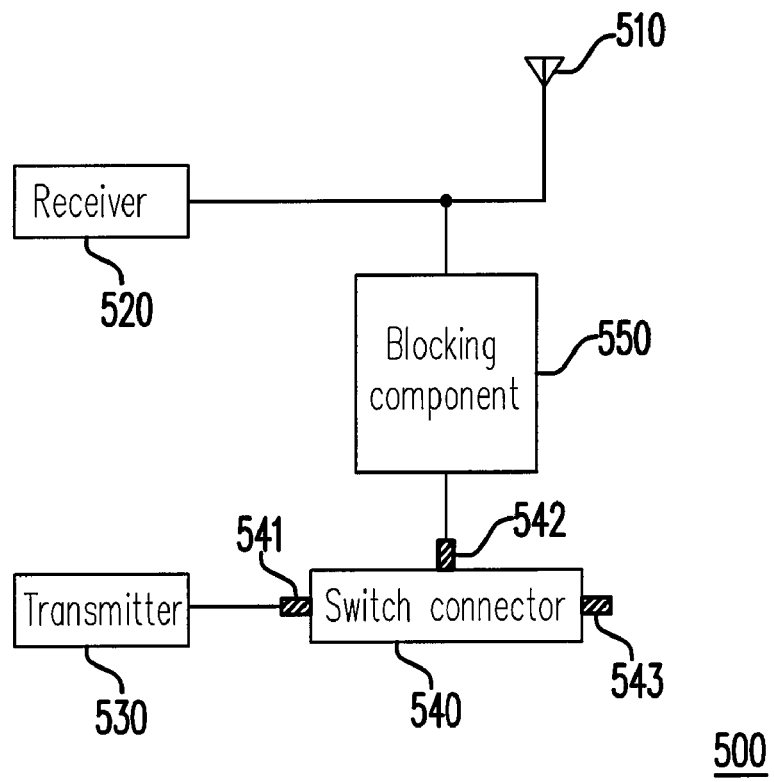
FIG. 5 is a structural diagram of an expandable wireless transceiver according to another embodiment of the present invention.

FIG. 5 is a structural diagram of an expandable wireless transceiver according to another embodiment of the present invention. As shown in FIG. 5, the expandable wireless transceiver 500 includes an antenna 510, a receiver 520, a transmitter 530, a switch connector 540 and a blocking component 550. The blocking component 550 has a first terminal and a second terminal. The first terminal is coupled to the antenna 510 and the receiver 520, and the second terminal is coupled to the switch connector 540. The switch connector 540 has a first connection terminal 541, a second connection terminal 542 and a third connection terminal 543. The first connection terminal 541 is coupled to the transmitter 530, the second connection terminal 542 is coupled to the second terminal of the blocking component 550, and the third connection terminal 543 is used for providing a connective path to an expansion antenna (not shown).

In the present embodiment, the transmission and reception of signal by the expandable wireless transceiver 500 are similar to the expandable wireless transceiver 300 in the foregoing embodiment. Therefore, only the blocking component 550 is described in detail here. The blocking component 550 in the present embodiment is used for attenuating the radio-frequency signal delivered by the switch connector 540 so as to adjust the transmitting power of the expandable wireless transceiver 500. Furthermore, the blocking component 550 has a high impedance value so that it can prevent the signal with the first central frequency received by the antenna 510 from delivering to the switch connector 540. Therefore, through the action of the blocking component 550, interference between the transmitting and receiving signals is minimized so as to prevent its effect on the sensitivity of reception of the expandable wireless transceiver 500. In the present embodiment, the blocking component 550 can be an isolator, an attenuator, a resistor, an inductor or a capacitor, and any one of the above devices can be used to achieve the foregoing effects.

Figure 6:
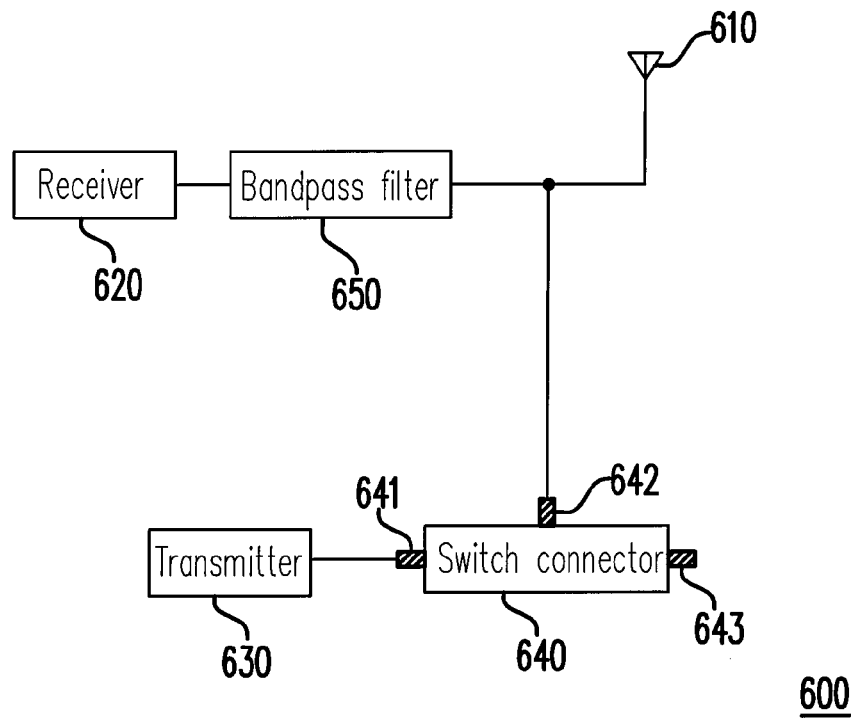
FIG. 6 is a structural diagram of an expandable wireless transceiver according to another embodiment of the present invention.

FIG. 6 is a structural diagram of an expandable wireless transceiver according to another embodiment of the present invention. As shown in FIG. 6, the expandable wireless transceiver 600 includes an antenna 610, a receiver 620, a transmitter 630, a switch connector 640 and a bandpass filter 650. The bandpass filter 6650 is coupled between the antenna 610 and the receiver 620. The switch connector 640 has a first connection terminal 641, a second connection terminal 642 and a third connection terminal 643. The first connection terminal 641 is coupled to the transmitter 630, the second connector terminal 642 is coupled to the antenna 610, and the third connection terminal 643 is used for providing a connective path to an expansion antenna (not shown).

In the present embodiment, the transmission and reception of signal by the expandable wireless transceiver 600 are similar to the expandable wireless transceiver 300 in the foregoing embodiment. Therefore, only the bandpass filter 650 is described in detail here. The bandpass filter 650 in the present embodiment is used for filtering the radio-frequency signal with the second central frequency. In other words, the bandpass filter 650 only allows the signal with first central frequency to pass through for delivering the signal with first central frequency to the receiver 620. Therefore, through the foregoing action, selectivity of the expandable wireless transceiver 600 is enhanced so that the transmitting and receiving capacity of the expandable wireless transceiver 600 is improved. It should be noted that the bandpass filter 650 illustrated in the present embodiment could be disposed in the receiver 620. In other words, anyone skilled in the art may switch the position for disposing the bandpass filter according to the design requirement.

Figure 7:
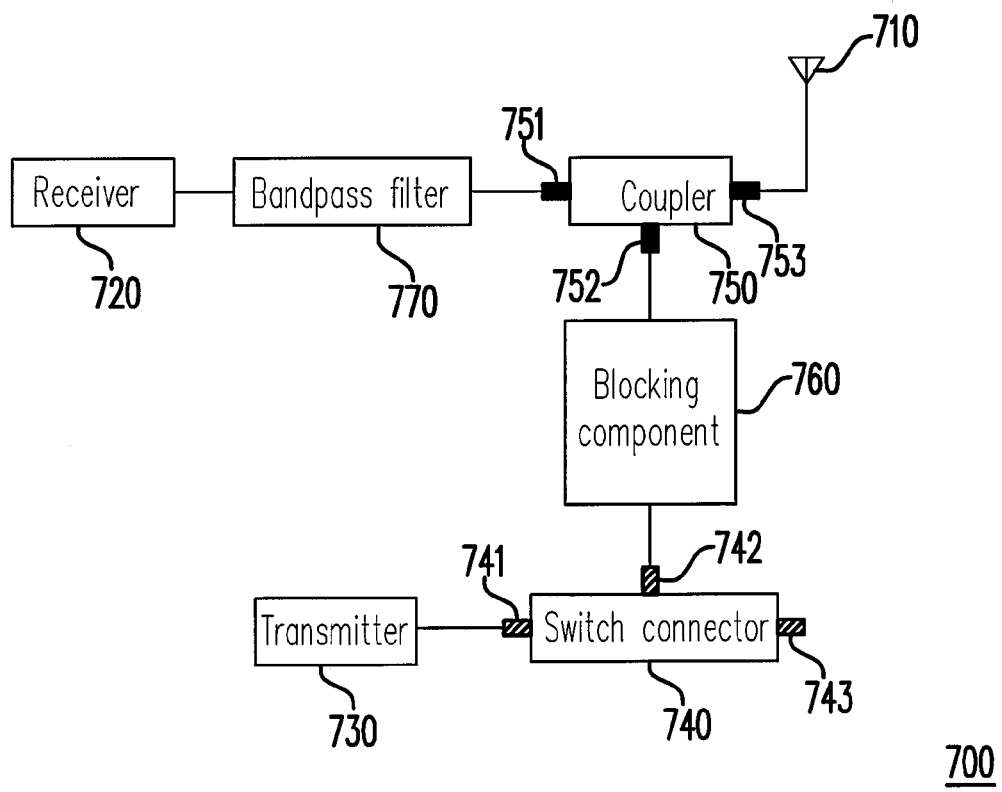
FIG. 7 is a structural diagram of an expandable wireless transceiver according to another embodiment of the present invention.

FIG. 7 is a structural diagram of an expandable wireless transceiver according to another embodiment of the present invention. As shown in FIG. 7, the expandable wireless transceiver 700 includes an antenna 710, a receiver 720, a transmitter 730, a switch connector 740, a coupler 750, an blocking component 760 and a bandpass filter 770.

Again, as shown in FIG. 7, the bandpass filter 770 is coupled between the receiver 720 and the coupler 750. The coupler 750 has a first signal terminal 751, a second signal terminal 752 and a third signal terminal 753. The first signal terminal 751 is coupled to the bandpass filter 770, the second signal terminal 752 is coupled to the blocking component 760, and the third signal terminal 753 is coupled to the antenna 710. The blocking component 760 has a first terminal and a second terminal, wherein the first terminal is coupled to the second signal terminal 752 of the coupler 750 and the second terminal is coupled to the switch connector 740.

In addition, the switch connector 740 has a first connection terminal 741, a second connection terminal 742 and a third connection terminal 743. The first connection terminal 741 is coupled to the transmitter 730, the second connection terminal 742 is coupled to the second terminal of the blocking component 760, and the third connection terminal 743 is used for providing a connective path to an expansion antenna (not shown).

In the present embodiment, the transmission and reception of signal by the expandable wireless transceiver 700 are similar to the expandable wireless transceivers in the foregoing embodiments. Here, the coupler, the blocking component and the bandpass filter used in the foregoing embodiments are disposed inside the expandable wireless transceiver 700. Consequently, the expandable wireless transceiver 700 of the present embodiment includes the characteristics of all the foregoing embodiments. As a result, the expandable wireless transceiver 700 of the present embodiment has better transmitting and receiving performance. However, the expandable wireless transceiver of the present invention is not limited to the combinations as illustrated in the foregoing embodiments. Any two of the coupler, the blocking component and the bandpass filter used in the foregoing embodiment can be taken and their method of coupling can be deduced from the foregoing embodiments.

In summary, the present invention uses a switch connector to connect an expansion antenna so that the expandable wireless transceiver can have a single-antenna operating mode and a two-antenna operating mode and retain the characteristic of using a single antenna or two antennas. Therefore, a user can determine whether to use a single antenna or two antennas according to the characteristic of the signal reception and the convenience of the installation. As a result, usefulness of the expandable wireless transceiver is substantially increased so that the user can use the transceiver with great convenience.

Moreover, the present invention also provides a number of combinations of components for building the expandable wireless transceiver so that the signal transmission and reception capacity of the expandable wireless transceiver is improved and the manufacturer has more options for manufacturing the product.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An expandable wireless transceiver, comprising:
   an antenna, for detecting an electromagnetic signal from surrounding space and receiving a signal with a first central frequency according to the detection result;
   a receiver, coupled to the antenna for receiving the signal delivered by the antenna;
   a transmitter, for outputting a radio-frequency signal with a second central frequency; and
   a switch connector, having a first connection terminal coupled to the transmitter, a second connection terminal coupled to the antenna and a third connection terminal, wherein the third connection terminal provides an connective path to an expansion antenna, and the first connected terminal delivers the radio-frequency signal with the second central frequency to the second connection terminal or the third connection terminal according to the coupling condition of the third connection terminal,
   wherein the expandable wireless transceiver transmits the radio-frequency signal with the second central frequency to surrounding space through the antenna or the expansion antenna, and the second central frequency and the first central frequency are both in a specific band.

2. The expandable wireless transceiver according to claim 1, wherein the switch connector comprises two metal conductive lines and a metal conductive plate, and a front end of one of the metal conductive lines has a metal spring, wherein a first end of the first metal conductive line is coupled to the first connection terminal of the switch connector, a first end of the other metal conductive line is coupled to the second connection terminal of the switch connector and a second end of the other metal conductive line is coupled to a second end of the metal conductive line, and the metal conductive plate is coupled to a ground.

3. The expandable wireless transceiver according to claim 1, wherein the third connection terminal is coupled to the expansion antenna, conversely, the first connection terminal is coupled to the second connection terminal.

4. The expandable wireless transceiver according to claim 1, further comprising:

a coupler, having a first signal terminal coupled to the receiver, a second signal terminal coupled to the second connection terminal, and a third signal terminal coupled to the antenna, wherein the signal with the first central frequency received by the third signal terminal is coupled to the first signal terminal, and the radio-frequency signal with second central frequency received by the second signal terminal is coupled to the third signal terminal.

5. The expandable wireless transceiver according to claim 4, wherein the coupler comprises a directional coupler, a wave separator or a coherent phase combiner.

6. The expandable wireless transceiver according to claim 4, further comprising:

an blocking component, having a first terminal and a second terminal, wherein the first terminal is coupled to the second signal terminal of the coupler, and the second terminal is coupled to the second connection terminal of the switch connector for attenuating the radio-frequency signal with the second central frequency.

7. The expandable wireless transceiver according to claim 6, wherein the blocking component comprises an isolator, an attenuator, a resistor, an inductor or a capacitor.

8. The expandable wireless transceiver according to claim 4, further comprising:

a bandpass filter, coupled between the coupler and the receiver for filtering the radio-frequency signal with the second central frequency.

9. The expandable wireless transceiver according to claim 1, further comprising:

an blocking component, having a first terminal and a second terminal, wherein the first terminal is coupled to the antenna, and the second terminal is coupled to the second connection terminal of the switch connector for attenuating the radio-frequency signal with the second central frequency.

10. The expandable wireless transceiver according to claim 9, wherein the blocking component comprises an isolator, an attenuator, a resistor, an inductor or a capacitor.

11. The expandable wireless transceiver according to claim 9, further comprising:

a bandpass filter, coupled between the antenna and the receiver for filtering the radio-frequency signal with the second central frequency.

12. The expandable wireless transceiver according to claim 1, wherein the receiver comprises:

a bandpass filter, coupled to the antenna for filtering the radio-frequency signal with the second central frequency.

13. The expandable wireless transceiver according to claim 1, wherein the specific band comprises one of the communication bands specified for frequency modulation wireless broadcast, Bluetooth system and global mobile communication system.

* * * * *